(12) United States Patent
Peng

(10) Patent No.: US 12,256,146 B2
(45) Date of Patent: Mar. 18, 2025

(54) PHOTOGRAPHING METHOD, ELECTRONIC DEVICE AND STORAGE MEDIUM

(71) Applicant: BEIJING XIAOMI MOBILE SOFTWARE CO., LTD., Beijing (CN)

(72) Inventor: Cong Peng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 112 days.

(21) Appl. No.: 18/088,380

(22) Filed: Dec. 23, 2022

(65) Prior Publication Data

US 2024/0114242 A1    Apr. 4, 2024

(30) Foreign Application Priority Data

Sep. 30, 2022   (CN) .......................... 202211210411.4

(51) Int. Cl.
  *H04N 23/67* (2023.01)
  *G06T 7/20* (2017.01)
  *G06T 7/70* (2017.01)

(52) U.S. Cl.
  CPC ............. *H04N 23/675* (2023.01); *G06T 7/20* (2013.01); *G06T 7/70* (2017.01); *G06T 2207/10016* (2013.01); *G06T 2207/20021* (2013.01); *G06T 2207/20076* (2013.01)

(58) Field of Classification Search
  CPC ...... H04N 23/675; H04N 23/61; H04N 23/67; H04N 23/45; G06T 7/20; G06T 7/70; G06T 2207/10016; G06T 2207/20021; G06T 2207/20076
  See application file for complete search history.

(56) References Cited

U.S. PATENT DOCUMENTS

| 10,757,332 B2 * | 8/2020 | Feng .................... H04N 23/673 |
| 2015/0043808 A1 * | 2/2015 | Takahashi ............... G06T 7/529 382/154 |
| 2018/0232894 A1 | 8/2018 | Kim et al. |
| 2019/0378318 A1 * | 12/2019 | Roache .................... G06T 5/73 |

(Continued)

FOREIGN PATENT DOCUMENTS

| EP | 4064689 A1 | 9/2022 |
| WO | WO-2021031840 A1 * | 2/2021 ............... G06T 7/70 |

OTHER PUBLICATIONS

Search Report for EP application 22216923.7 dated Aug. 23, 2023, 12 pages.

*Primary Examiner* — Padma Haliyur
(74) *Attorney, Agent, or Firm* — Arch & Lake LLP

(57) ABSTRACT

A photographing method is provided. The method includes: in a case where a target object is detected to be included in a first photographing region, acquiring relative motion information between the target object and a terminal device, in which a photographing region corresponding to a first camera in the terminal device is a second photographing region, a photographing region corresponding to a second camera is a third photographing region, and the first photographing region is a region in the second photographing region other than the third photographing region; according to the relative motion information, obtaining focusing information when the target object enters the third photographing region; and performing focusing on the target object based on the focusing information when the target object enters the third photographing region.

18 Claims, 6 Drawing Sheets

(56) References Cited

U.S. PATENT DOCUMENTS

| | | | |
|---|---|---|---|
| 2020/0112685 A1* | 4/2020 | Li | H04N 23/675 |
| 2020/0125831 A1* | 4/2020 | Zhuo | G06V 40/161 |
| 2020/0128181 A1* | 4/2020 | An | G06T 7/20 |
| 2020/0320279 A1* | 10/2020 | Zhou | G06F 18/22 |
| 2021/0311469 A1* | 10/2021 | Zhang | G06F 18/24 |
| 2022/0070362 A1* | 3/2022 | Nagayama | H04N 23/67 |
| 2022/0292696 A1 | 9/2022 | Peng | |
| 2023/0269459 A1* | 8/2023 | Liu | H04N 23/67 |
| | | | 348/333.03 |

* cited by examiner in response to detecting that a target object is included in a first photographing region, acquiring relative motion information between the target object and a terminal device, in which a photographing region corresponding to a first camera in the terminal device is a second photographing region, a photographing region corresponding to a second camera is a third photographing region, and the first photographing region is a region in the second photographing region other than the third photographing region — 101 according to the relative motion information, determining focusing information when the target object enters the third photographing region — 102 performing focusing on the target object based on the focusing information in response to the target object entering the third photographing region — 103

FIG. 1

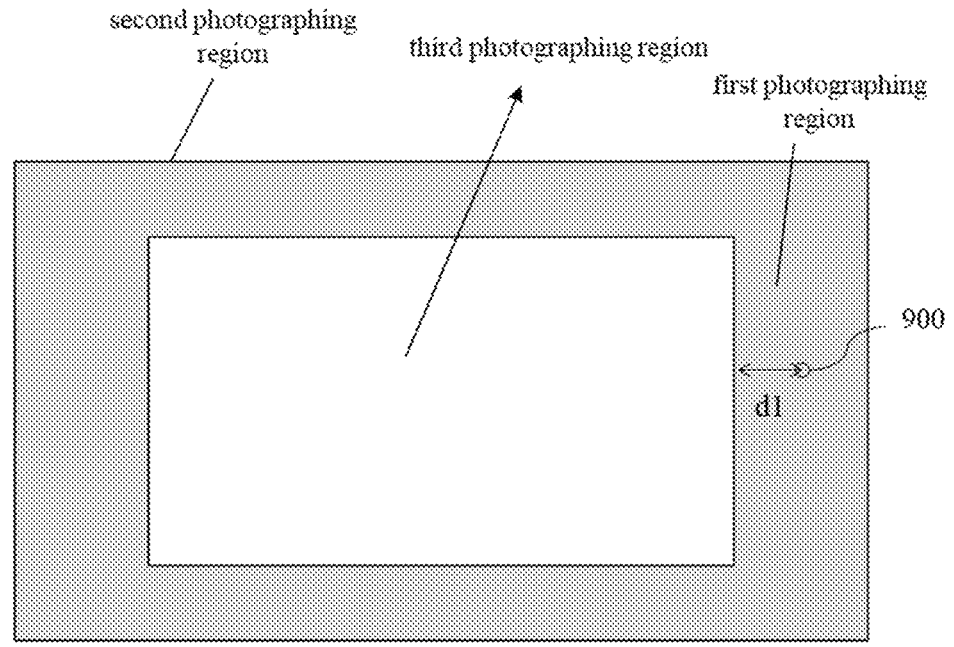

FIG. 2

PHOTOGRAPHING METHOD, ELECTRONIC DEVICE AND STORAGE MEDIUM

CROSS-REFERENCE TO RELATED APPLICATIONS

The present application is based upon and claims priority to Chinese Patent Application Serial No. 2022112104114, filed on Sep. 30, 2022, the entire contents of which are incorporated herein by reference for all purposes.

BACKGROUND

With a continuous development of a mobile terminal technology, more and more users are accustomed to photographing images using mobile terminals.

SUMMARY

The present disclosure relates to the field of photographing technologies, and particularly to a photographing method, an electronic device and a storage medium.

A first aspect of the present disclosure provides a photographing method, including: in response to detecting that a target object is included in a first photographing region, acquiring, by a terminal device, relative motion information between the target object and the terminal device, in which a photographing region corresponding to a first camera in the terminal device is a second photographing region, a photographing region corresponding to a second camera is a third photographing region, and the first photographing region is a region in the second photographing region other than the third photographing region; according to the relative motion information, obtaining, by the terminal device, focusing information in response to determining that the target object enters the third photographing region; and performing, by the terminal device, focusing on the target object based on the focusing information in response to the target object entering the third photographing region.

A second aspect of the present disclosure provides an electronic device, including: a memory, a processor and a computer program stored on the memory and executable on the processor, and the processor executes the program to implement the photographing method according to the first aspect of the present disclosure.

A third aspect of the present disclosure provides a non-transitory computer-readable storage medium, which stores a computer program, and the computer program, when executed by a processor, implements the photographing method according to the first aspect of the present disclosure.

BRIEF DESCRIPTION OF THE DRAWINGS

The above and/or additional aspects and advantages of the present disclosure will become apparent and more readily appreciated from the following descriptions made with reference to the drawings, in which:

FIG. 1 is a schematic flow chart of a photographing method according to an embodiment of the present disclosure;

FIG. 2 is a schematic diagram of photographing regions of cameras in a terminal device according to an embodiment of the present disclosure;

DETAILED DESCRIPTION

Figure 3:
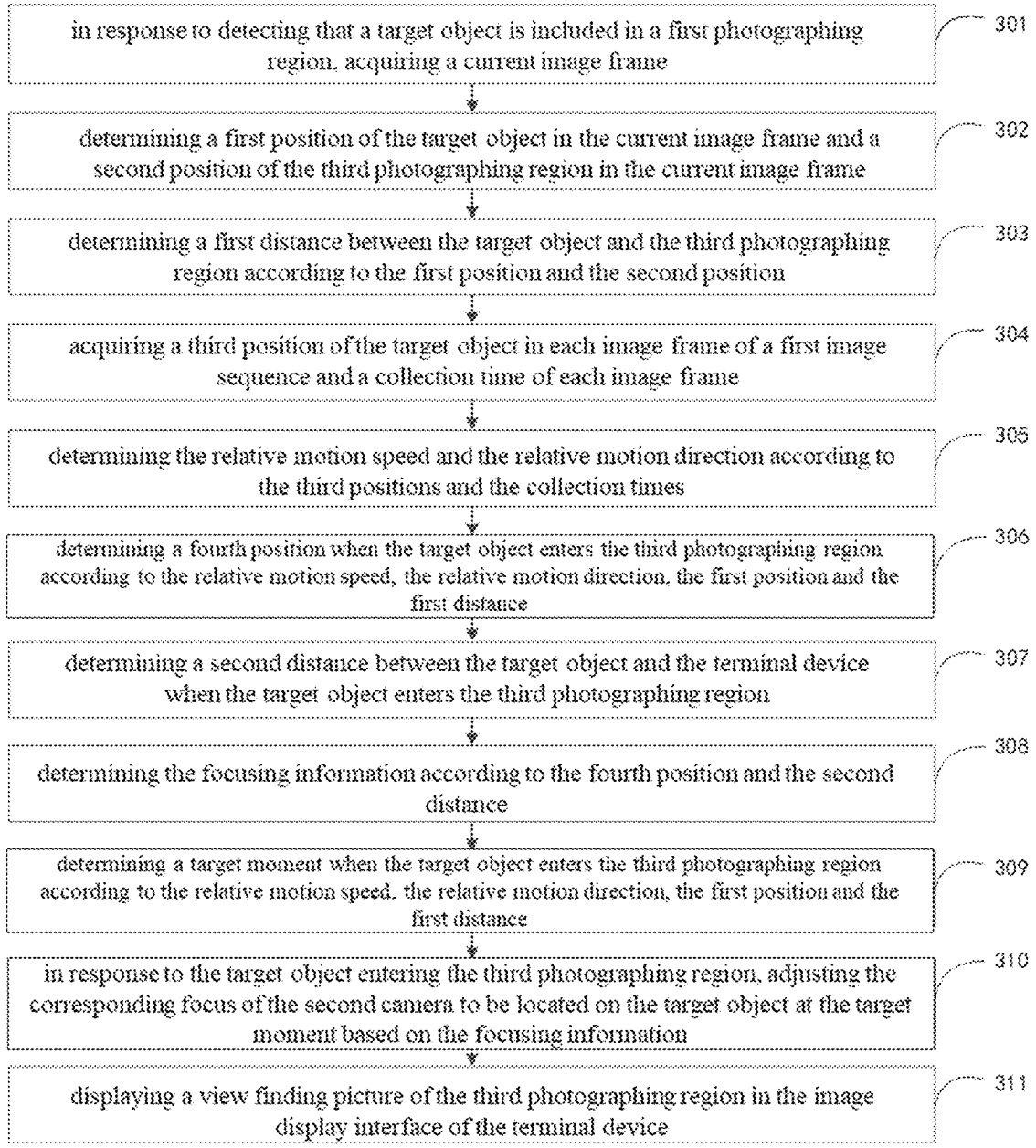
FIG. 3 is a schematic flow chart of a photographing method according to another embodiment of the present disclosure.

Description will be made in detail to embodiments of the present disclosure, and the examples of embodiments are illustrated in the drawings, in which the same or similar elements and the elements having same or similar functions are denoted by like reference numerals throughout the descriptions. Embodiments described below with reference to drawings are illustrative, and intended for explaining the present disclosure. Embodiments shall not be construed to limit the present disclosure.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In the process of photographing images using the mobile terminal, if a moving object suddenly enters a finder frame, an inaccurate focusing problem may occur, resulting in a problem of unclear photographing of the object in snapshot or video recording.

A photographing method and apparatus, an electronic device and a storage medium according to embodiments of the present disclosure are described below with reference to the accompanying drawings.

Embodiments of the present disclosure are exemplified with the photographing method configured in the photographing apparatus, and the photographing apparatus may be applied to any electronic device to enable the electronic device to execute a photographing function.

FIG. 1 is a schematic flow chart of a photographing method according to an embodiment of the present disclosure.

As illustrated in FIG. 1, the photographing method may include the following steps:

At block 101: in response to detecting that a target object is included in a first photographing region, relative motion information between the target object and a terminal device is acquired, in which a photographing region corresponding to a first camera in the terminal device is a second photographing region, a photographing region corresponding to a second camera is a third photographing region, and the first photographing region is a region in the second photographing region other than the third photographing region.

The target object may be an object moving relative to ground in the first photographing region, such as a flying bird, a moving car, or the like; or, the target object may be an object which is stationary relative to the ground but moves relative to the terminal device, such as a stationary car in the first photographing region, a stationary house, or the like, which is not limited in the present disclosure.

The first camera may be a wide angle camera in the terminal device, and the second camera may be a main camera in the terminal device, which is not limited in the present disclosure. The first photographing region is the region in the second photographing region other than the third photographing region, i.e., a region which can be photographed by the wide angle camera but cannot be photographed by the main camera.

For example, as illustrated in FIG. 2, a region enclosed by a large rectangular frame is the second photographing region corresponding to the first camera, a white region enclosed by a small rectangular frame is the third photographing region corresponding to the second camera, and a gray region in the figure is the first photographing region.

In some examples, the relative motion information may include a relative motion track, a relative motion speed and a relative motion direction of the target object at the current moment relative to the terminal device, a position of the target object relative to the terminal device, a distance between the target object and the third photographing region of the terminal device, or the like, which is not limited in the present disclosure.

In some examples, the relative motion speed may be a speed at which the target object moves in an image display interface of the terminal device, i.e., the number of pixels passed per second in an image of the terminal device; that is, the unit of the motion speed may be pixel/second. Or, the relative motion speed and the relative motion direction of the target object and the terminal device may be determined according to an actual motion track of the terminal device and an actual motion track of the target object. In some examples, the motion track of the terminal device may be determined according to an acceleration sensor of the terminal device.

The position of the target object relative to the terminal device may be an actual distance between the terminal device and the target object.

The distance between the target object and the third photographing region of the terminal device may be a smallest actual distance between the target object and the third photographing region; or, the distance may be a distance between the target object and the third photographing region in the image photographed by the terminal device; that is, the distance between the target object and the third photographing region in the terminal device may be represented by the number of pixels, which is not limited in the present disclosure.

At block 102: according to the relative motion information, focusing information when the target object enters the third photographing region is determined.

In some examples, the focusing information may include: a focal length, a focal position, or the like of the second camera, which is not limited in the present disclosure.

In some examples, position information of the target object (i.e., the focal position) when the target object enters the third photographing region may be predicted according to the relative motion information, and then, the focal length of the second camera is determined according to the focal position.

At block 103: focusing is performed on the target object based on the focusing information in response to the target object entering the third photographing region.

It may be understood that, after the focusing information is determined, when the target object enters the third photographing region, a focus of the terminal device may be adjusted to be located on the target object based on the focusing information. Specifically, the focal length of the second camera may be adjusted based on the focusing information at the moment when the target object enters the third photographing region, to locate the focus at the target object. Thus, when the target object suddenly enters the photographing region of the main camera, the focus of the main camera can be accurately adjusted to be located on the target object, and therefore, the target object can be clearly photographed.

It should be noted that embodiments of the present disclosure is not only suitable for a scenario where the terminal device moves and the target object does not move, but also suitable for a scenario where the terminal device does not move and the target object moves and a scenario where the terminal device and the target object move simultaneously, which is not limited in the present disclosure.

In embodiments of the present disclosure, first, in the case where the target object is detected to be included in the first photographing region, the relative motion information between the target object and the terminal device is acquired, the photographing region corresponding to the first camera in the terminal device is the second photographing region, the photographing region corresponding to the second camera is the third photographing region, and the first photographing region is the region in the second photographing region other than the third photographing region; then, the focusing information when the target object enters the third photographing region is determined according to the relative motion information; and finally, in the case where the target object enters the third photographing region, focusing is performed on the target object based on the focusing information. Thus, after the target object appears in the first photographing region, the focusing information when the target object enters the third photographing region may be determined according to the relative motion information of the target object relative to the terminal device, such that accurate focusing can be performed on the target object when the target object enters the third photographing region, and then, the target object may be photographed clearly.

FIG. 3 is a schematic flow chart of a photographing method according to an embodiment of the present disclosure, and as illustrated in FIG. 3, the photographing method may include the following steps:

At block 301: in response to detecting that a target object is included in a first photographing region, a current image frame is acquired.

The current image frame may be an image which includes a view finding picture of the first photographing region and a view finding picture of a third photographing region and is photographed by a terminal device when the target object is detected to be included in the first photographing region.

At block 302: a first position of the target object in the current image frame and a second position of the third photographing region in the current image frame are determined.

In some examples, target recognition may be performed on the current image frame to determine the first position of the target object in the current image frame.

In some examples, the second position of the third photographing region in the current image frame may be determined according to a position of the view finding picture corresponding to the third photographing region in the current image frame.

At block 303: a first distance between the target object and the third photographing region is determined according to the first position and the second position.

The first position and the first distance may be used together as relative position information between the target object and the terminal device.

It may be understood that, since the second position may be a rectangular region of the third photographing region in the current image frame, a minimum distance between the first position and the rectangular region may be determined as the first distance between the target object 900 and the third photographing region, as illustrated in FIG. 2.

At block 304: a third position of the target object in each image frame of a first image sequence and a collection time of each image frame are acquired, the first image sequence being collected by the terminal device in a first continuous time period before a current moment.

It should be noted that, since a relative motion speed and a relative motion direction between the target object and the terminal device at the current moment are obtained, the first continuous time period is not suitable to be too long or too short. For example, at least three and no more than five image frames may be included in the first image sequence collected during the first continuous time period, which is not limited in the present disclosure.

In some examples, the first continuous time period may be a preset time period, or the first continuous time period may be determined according to a frequency of collecting images by the terminal device, which is not limited in the present disclosure.

At block 305: the relative motion speed and the relative motion direction are determined according to the third positions and the collection times.

For example, a sampling time interval between two adjacent image frames may be determined according to the collection time of each image frame, a displacement of the target object between the two adjacent image frames may be then determined according to the third position of the target object in each image frame, and finally, the relative motion speed and the relative motion direction may be determined according to the sampling time interval and the displacement between the two adjacent image frames.

In some examples, a motion speed of the target object between last two adjacent image frames in the first image sequence may be determined as the relative motion speed between the target object and the terminal device at the current moment; or, an average speed of the target object in the first continuous time period may be used as the relative motion speed at the current moment, which is not limited in the present disclosure.

The relative motion speed may be the number of pixels passed per second in an image of the terminal device; that is, a unit of the motion speed may be pixel/second.

At block 306: a fourth position when the target object enters the third photographing region is determined according to the relative motion speed, the relative motion direction, the first position and the first distance.

It may be understood that, after determination of the relative motion speed and the relative motion direction between the target object and the terminal device, and the first position of the target object in the current image frame, and the first distance between the target object and the third photographing region in the current image frame, the fourth position when the target object enters the third photographing region may be predicted. The fourth position may be a coordinate position of the target object in the image display interface of the terminal device.

In some examples, after the fourth position when the target object enters the third photographing region is determined according to the relative motion speed, the relative motion direction, the first position and the first distance, a relative acceleration between the target object and the terminal device at the current moment may be further obtained, and the fourth position when the target object enters the third photographing region is corrected according to the relative acceleration.

For example, the relative acceleration of the target object is determined according to the relative motion speeds of the target object between two adjacent image frames, and the fourth position included in the focusing information when the target object enters the third photographing region is determined according to the relative motion speed, the relative motion direction, the relative acceleration, the first position and the first distance. The acceleration can represent a change condition of the motion speed of the target object; that is, whether the target object performs acceleration motion or deceleration motion relative to the terminal device in a subsequent time can be determined, thus improving accuracy of determination of the fourth position when the target object enters the third photographing region.

At block 307: a second distance between the target object and the terminal device when the target object enters the third photographing region is determined.

In some examples, the second distance may be determined according to data obtained after the target object reflects light emitted from the terminal device.

Figure 8:
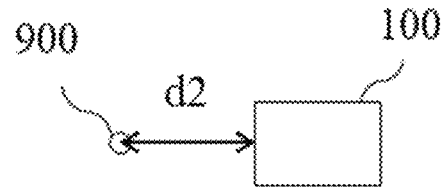
FIG. 8 shows a schematic diagram of a target object and an electronic device according to an embodiment of the present disclosure.

For example, when the terminal device photographs an image, infrared light may be emitted to the target object through a ranging sensor, and then, data reflected by the target object may be received by the ranging sensor, to determine the second distance between the target object and the terminal device, as illustrated in FIG. 8, which shows a schematic diagram of a target object 900 and an electronic device 100 according to an embodiment of the present disclosure. In some examples, the ranging sensor may be a time-of-flight sensor, or the like, which is not limited in the present disclosure.

It may be understood that a time for the target object to enter the third photographing region from the first photographing region is short, the distance between the target object and the terminal device does not change much, and when the second camera of the terminal device is focused at the second distance from the terminal device, objects within a certain distance range around the second distance can be clearly photographed. Therefore, the distance between the target object and the terminal device at the current moment may be determined as the second distance between the target object and the terminal device when the target object enters the third photographing region, which is not limited in the present disclosure.

At block 308: the focusing information is determined according to the fourth position and the second distance.

It may be understood that, after determination of the fourth position and the second distance between the target object and the terminal device when the target object enters the third photographing region, a three-dimensional focal position of the target object relative to the terminal device and the focal length of the second camera can be determined.

At block 309: a target moment when the target object enters the third photographing region is determined according to the relative motion speed, the relative motion direction, the first position and the first distance.

The target moment may be a time when the target object is about to enter the third photographing region from the first photographing region.

In some examples, the target moment when the target object enters the third photographing region may also be determined according to the relative motion speed, the relative motion direction, the first position and the first distance in conjunction with the relative acceleration, such that the determined target moment is more accurate.

At block 310: in response to the target object entering the third photographing region, the corresponding focus of the second camera is adjusted to be located on the target object at the target moment based on the focusing information.

It may be understood that, after the target moment when the target object enters the third photographing region and the focusing information are determined, the second camera can be adjusted at the target moment based on the focal length and the focal position included in the focusing information, such that the focus of the second camera is located on the target object, and thus, when the target object enters the third photographing region, the focus of the main camera can be accurately adjusted to be located on the target object, and then, the target object can be photographed clearly.

At block 311: a view finding picture of the third photographing region is displayed in the image display interface of the terminal device.

It may be understood that, after focusing on the target object based on the focusing information, the terminal device may clearly photograph the target object, and the view finding picture of the third photographing region is displayed in the image display interface of the terminal device; or, the view finding picture of the first photographing region may be displayed in the image display interface of the terminal device, which is not limited in the present disclosure.

In embodiments of the present disclosure, in the case where the first photographing region is detected to include the target object, the first position of the target object in the current image frame, the first distance between the target object and the third photographing region in the current image frame, and the relative motion speed and the relative motion direction between the target object and the terminal device may be obtained, and then, according to the relative motion speed, the relative motion direction, the first position, and the first distance, the target moment and the fourth position when the target object enters the third photographing region and the second distance between the target object and the terminal device are determined, and then, the focusing information is determined, and finally, focusing is performed on the target object based on the focusing information, and the view finding picture of the third photographing region is displayed on the image display interface of the terminal device. Thus, according to a motion track of the target object in the image display interface of the terminal device, the relative motion information of the target object relative to the terminal device is determined, and then, the focusing information when the target object enters the third photographing region is determined, such that the target object can be photographed clearly, and the photographed image containing the clear target object can be displayed in the image display interface.

Figure 4:
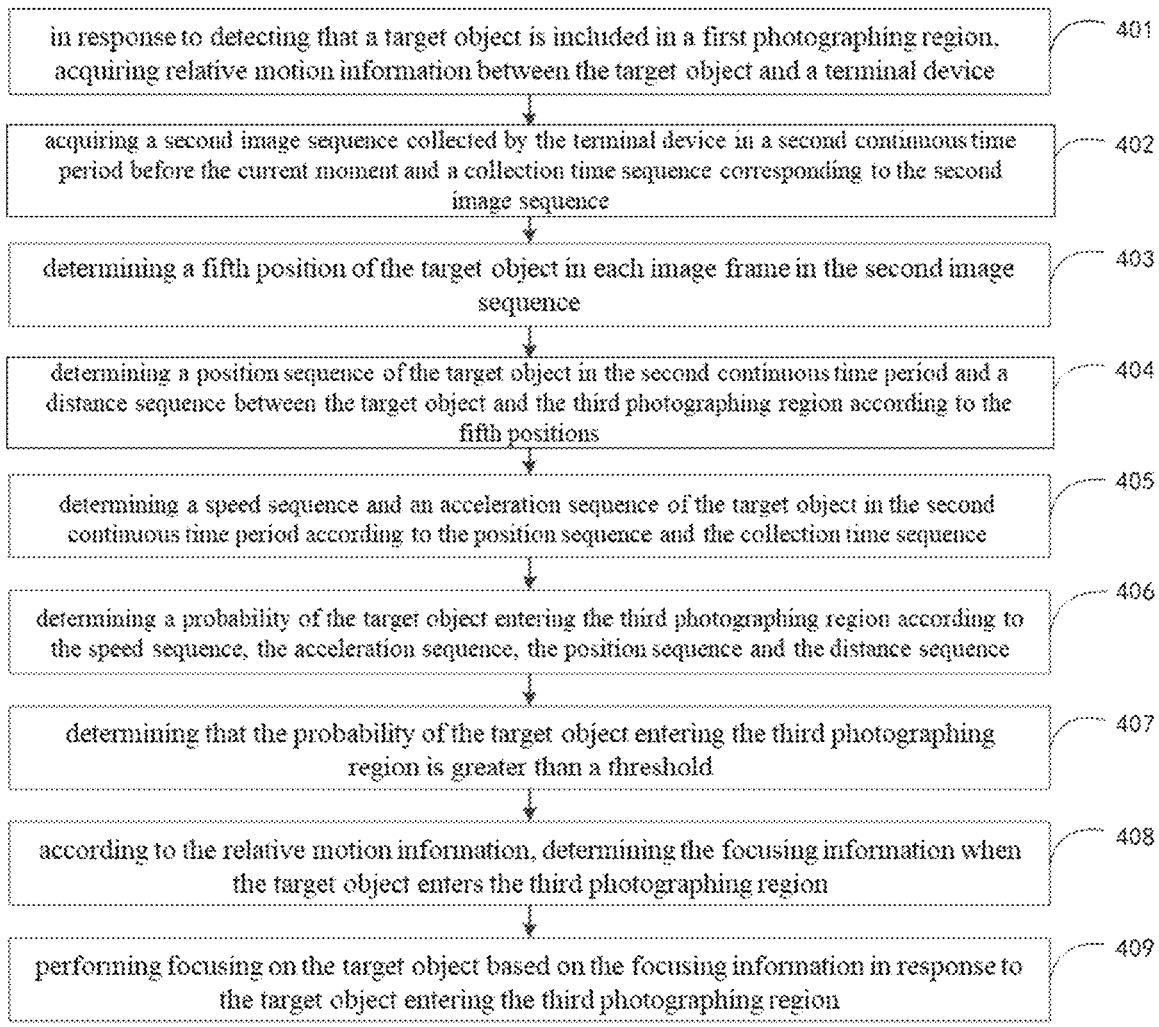
FIG. 4 is a schematic flow chart of a photographing method according to another embodiment of the present disclosure.

FIG. 4 is a schematic flow chart of a target object photographing method according to an embodiment of the present disclosure, and as illustrated in FIG. 4, the target object photographing method may include the following steps:

At block 401: in response to detecting that a target object is included in a first photographing region, relative motion information between the target object and a terminal device is acquired.

A photographing region corresponding to a first camera in the terminal device is a second photographing region, a photographing region corresponding to a second camera is a third photographing region, and the first photographing region is a region in the second photographing region other than the third photographing region.

At block 402: a second image sequence collected by the terminal device in a second continuous time period before the current moment and a collection time sequence corresponding to the second image sequence are acquired.

The second continuous time period may be a time period from a moment when the target object is detected to be included in the first photographing region to the current moment, which is not limited in the present disclosure.

The second image sequence includes all images collected by the terminal device in the second continuous time period. The collection time sequence includes times when the terminal device collects image frames in the second image sequence.

In some examples, collection time intervals between adjacent image frames in the second collection time sequence may be the same or different, which is not limited in the present disclosure.

At block 403: a fifth position of the target object in each image frame in the second image sequence is determined.

Specifically, target recognition is performed on each image frame in the second image sequence to obtain the fifth position of the target object in each image frame in the second image sequence.

At block 404: a position sequence of the target object in the second continuous time period and a distance sequence between the target object and the third photographing region are determined according to the fifth positions.

Figure 9:
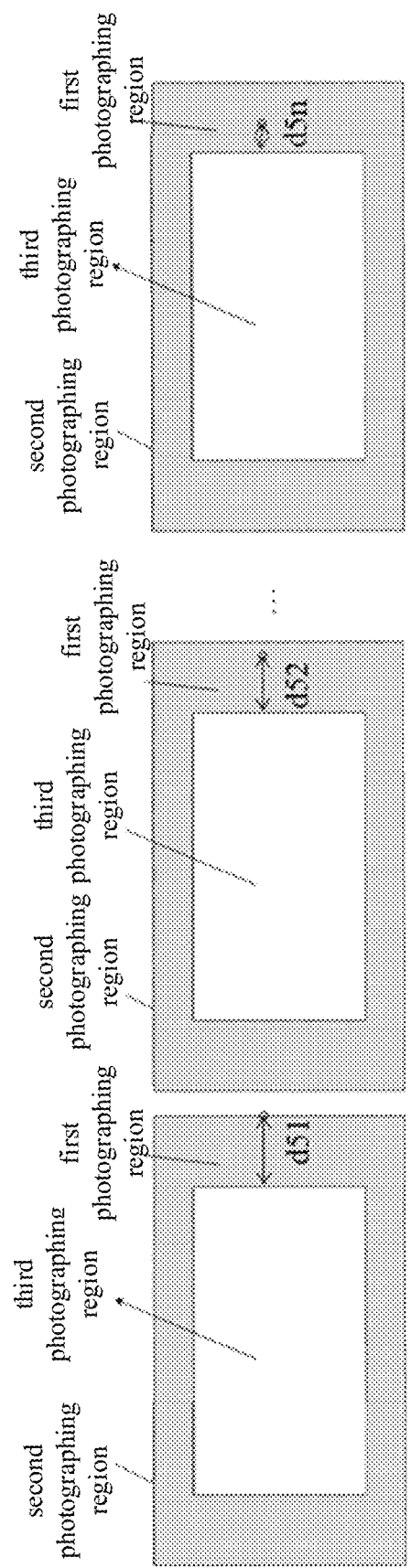
FIG. 9 shows a schematic diagram of a second image sequence according to an embodiment of the present disclosure.

The position sequence includes the fifth positions of the target object in the image frames in the second image sequence. The distance sequence $d51, D52 \ldots D5n$ includes distances between the target object and the third photographing region when the target object is located at the fifth positions in the image frames, as illustrated in FIG. 9, which shows a schematic diagram of a second image sequence according to an embodiment of the present disclosure.

In some examples, the distance between the target object and the third photographing region in the distance sequence may be the number of pixels between the target object and the third photographing region in each image frame, which is not limited in the present disclosure.

At block 405: a speed sequence and an acceleration sequence of the target object in the second continuous time period are determined according to the position sequence and the collection time sequence.

The speed sequence includes speeds of the target object between adjacent fifth positions. In some examples, each speed in the speed sequence may have a unit of pixel/second, which is not limited in the present disclosure.

For example, the position sequence is $[x_1, x_2, x_3, \ldots, x_n]$, the collection time sequence is $[t_1, t_2, t_3, \ldots, t_n]$, and the speed sequence is $$\left[\frac{x_2-x_1}{t_2-t_1}, \frac{x_3-x_2}{t_3-t_2}, \ldots, \frac{x_n-x_{n-1}}{t_n-t_{n-1}}\right].$$

The acceleration sequence includes accelerations corresponding to adjacent speeds.

At block 406: a probability of the target object entering the third photographing region is determined according to the speed sequence, the acceleration sequence, the position sequence and the distance sequence.

In some examples, the speed sequence, the acceleration sequence, the position sequence and the distance sequence may be input into a pre-trained probability prediction model, and the probability of the target object entering the third photographing region is predicted by the probability prediction model, to obtain the probability of the target object entering the third photographing region.

It should be noted that the unit corresponding to the speed included in the speed sequence is required to be matched with the unit of each distance in the distance sequence. That is, if the unit of the speed in the speed sequence is pixel/second, the unit of the distance in the distance sequence is pixel.

At block 407: the probability of the target object entering the third photographing region is determined to be greater than a threshold.

It may be understood that, after determination of the probability of the target object entering the third photographing region, the focusing information when the target object enters the third photographing region may be determined according to the relative motion information further in a case where the probability is greater than the threshold. A case where the probability is less than or equal to the threshold indicates that the target object may not enter the third photographing region, and thus, it is not necessary to determine the focusing information when the target object enters the third photographing region, thereby saving resources of the terminal device.

At block 408: according to the relative motion information, the focusing information when the target object enters the third photographing region is determined.

At block 409: focusing is performed on the target object based on the focusing information in response to the target object entering the third photographing region.

For specific implementations of step 408 and step 409, reference may be made to detailed descriptions in other embodiments of the present disclosure, and details are not repeated herein.

In embodiments of the present disclosure, the probability of the target object entering the third photographing region from the first photographing region may be determined first, and then, in the case where the probability is greater than the threshold, the focusing information when the target object enters the third photographing region is determined according to the relative motion information between the target object and the terminal device, and when the target object enters the third photographing region, focusing is performed on the target object based on the focusing information. Thus, the focusing information when the target object enters the third photographing region can be determined in the case where the probability of the target object entering the third photographing region is greater than the threshold, thereby saving the resources of the terminal device without affecting clear photographing of the target object.

Figure 5:
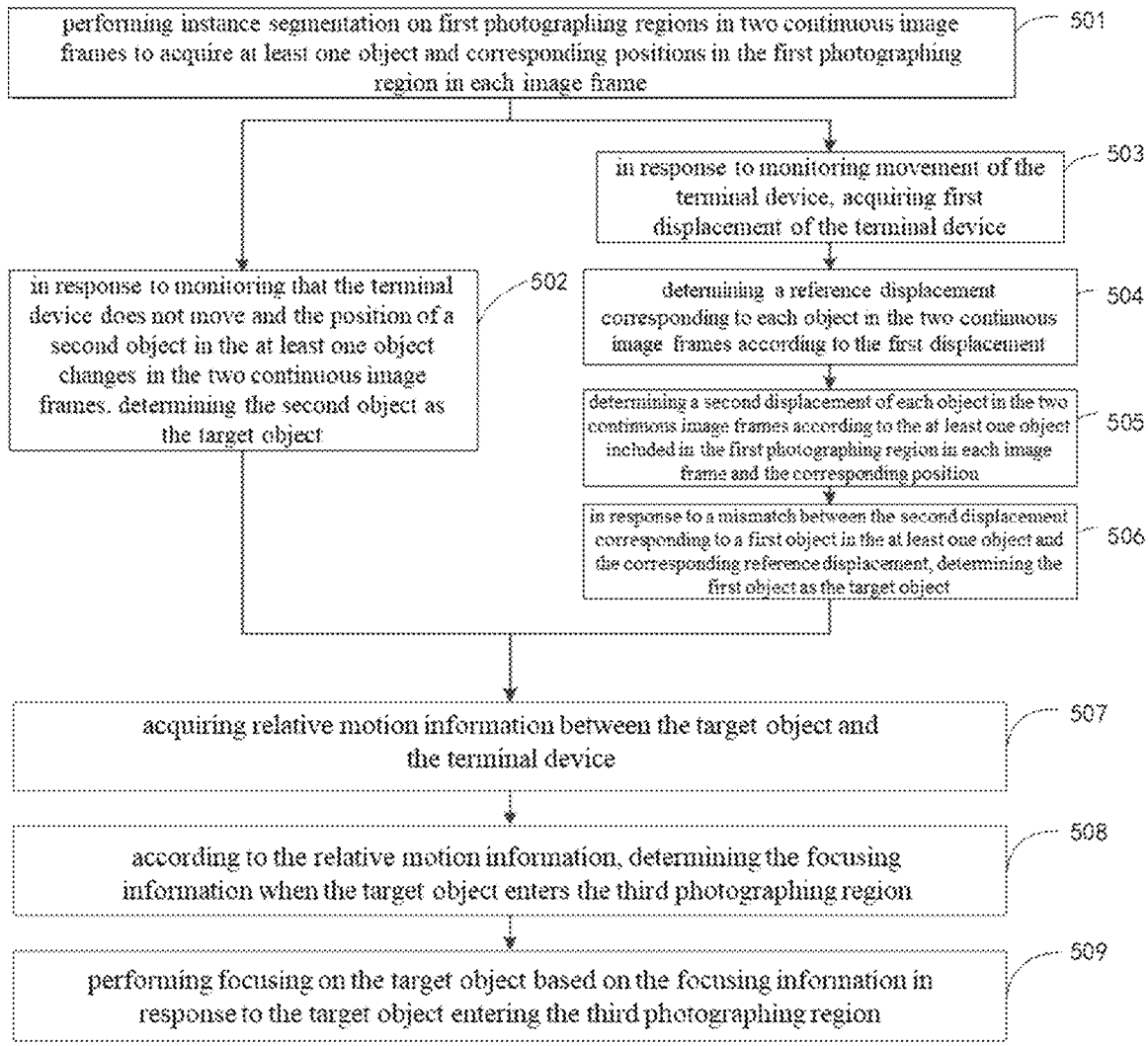
FIG. 5 is a schematic flow chart of a photographing method according to another embodiment of the present disclosure.

FIG. 5 is a schematic flow chart of a target object photographing method according to an embodiment of the present disclosure, and as illustrated in FIG. 5, the target object photographing method may include the following steps:

At block 501: instance segmentation on first photographing regions in two continuous image frames is performed to acquire at least one object and corresponding position in the first photographing region in each image frame.

The two continuous image frames can be images collected by a terminal device after an ultra-wide-angle photographing function of the terminal device is started. The terminal device may process the first photographing regions in the two collected continuous image frames in real time to determine whether the first photographing region includes the target object.

The object included in the first photographing region in each image frame may be a person, a vehicle, a bird, or the like, which is not limited in the present disclosure.

In some examples, a pre-trained instance segmentation model may be used to perform instance segmentation on each of the two continuous image frames, to determine each object and the corresponding position included in the first photographing region in each image frame.

At block 502: in response to monitoring that the terminal device does not move and the position of a second object in the at least one object changes in the two continuous image frames, the second object is determined as the target object.

In some examples, it is determined that the terminal device does not move in a case where measurement data of an acceleration sensor of the terminal device is not changed.

It may be understood that, if the terminal device does not move, but the position of any object in the first photographing region changes in the two continuous image frames, which indicates a change in the position of the object relative to other objects in the image, the object is determined as the target object.

At block 503: in response to monitoring movement of the terminal device, a first displacement of the terminal device is acquired.

In some examples, it is determined that the terminal device moves in a case where the measurement data of the acceleration sensor of the terminal device is changed. Then, the first displacement of the terminal device is determined according to the measurement data of the acceleration sensor.

The first displacement can be a displacement of the terminal device during collection of the two continuous image frames.

At block 504: a reference displacement corresponding to each object in the two continuous image frames is determined according to the first displacement.

The reference displacement corresponding to each object may be a displacement of the object in the two continuous image frames when the same object does not move and the terminal device moves.

It should be noted that the first displacement is the displacement of the terminal device, and then, the position change of the same fixed object in the two continuous image frames before and after the displacement of the terminal device can be determined according to the displacement of the terminal device and parameters of a first camera and a second camera in the terminal device.

At block 505: a second displacement of each object in the two continuous image frames is determined according to the at least one object included in the first photographing region in each image frame and the corresponding position.

Specifically, the second displacement of each object in the two continuous image frames is determined according to a difference between the position of each object in a second image frame in the two continuous image frames and the position of each object in a first image frame.

At block 506: in response to a mismatch between the second displacement corresponding to a first object in the at least one object and the corresponding reference displacement, the first object is determined as the target object.

It may be understood that the mismatch between the second displacement of the first object in the first photographing region and the corresponding reference displacement indicates that the first object moves relative to the ground during the collection of the two continuous image frames by the terminal device, and thus, the first object is determined as the target object, such as a flying bird, a running vehicle, or the like.

In some examples, the number of the first objects may be one or more, which is not limited in the present disclosure.

At block 507: relative motion information between the target object and the terminal device is acquired.

At block 508: according to the relative motion information, the focusing information when the target object enters the third photographing region is determined.

At block 509: focusing is performed on the target object based on the focusing information in response to the target object entering the third photographing region.

For specific implementations of step 507 to step 509, reference may be made to detailed descriptions in other embodiments of the present disclosure, and details are not repeated herein.

In embodiments of the present disclosure, whether the target object moving relative to the ground is included in the first photographing region can be accurately judged in a case where the terminal device moves or does not move, such that when the target object is included in the first photographing region, the focusing information when the target object enters the third photographing region is determined timely according to the relative motion information between the target object and the terminal device, and when the target object enters the third photographing region, focusing is performed on the target object based on the focusing information. Thus, whether the target object moving relative to the ground is included in the first photographing region can be accurately determined, and conditions are provided for clear photographing of the target object, thereby further improving photographing definition of the target object moving relative to the ground.

In order to realize the above embodiments, the present disclosure further provides a photographing apparatus.

Figure 6:
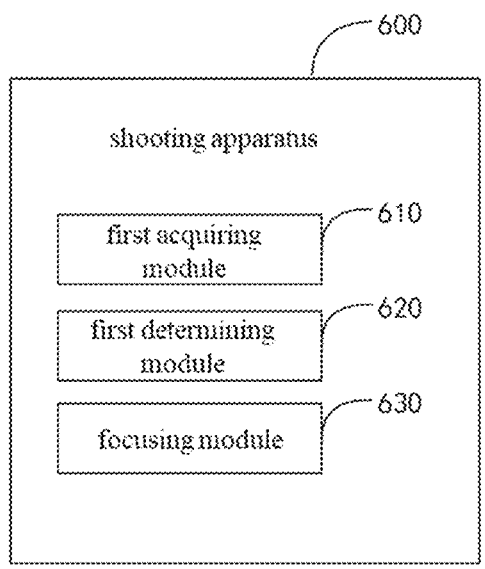
FIG. 6 is a schematic structural diagram of a photographing apparatus according to another embodiment of the present disclosure.

FIG. 6 is a schematic structural diagram of a photographing apparatus according to an embodiment of the present disclosure.

As illustrated in FIG. 6, the photographing apparatus 600 may include: a first acquiring module 610, a first determining module 620, and a focusing module 630.

The first acquiring module 610 is configured to, in response to detecting that a target object is included in a first photographing region, acquire relative motion information between the target object and a terminal device, in which a photographing region corresponding to a first camera in the terminal device is a second photographing region, a photographing region corresponding to a second camera is a third photographing region, and the first photographing region is a region in the second photographing region other than the third photographing region.

The first determining module 620 is configured to, according to the relative motion information, determine focusing information when the target object enters the third photographing region.

The focusing module 630 is configured to perform focusing on the target object based on the focusing information in response to the target object entering the third photographing region.

In some examples, the relative motion information includes relative position information between the target object and the terminal device, and the first acquiring module is specifically configured to: acquire a current image frame; determine a first position of the target object in the current image frame and a second position of the third photographing region in the current image frame; and determine a first distance between the target object and the third photographing region according to the first position and the second position.

In some examples, the relative motion information includes a relative motion speed and a relative motion direction between the target object and the terminal device, and the first acquiring module is further specifically configured to: acquire a third position of the target object in each image frame of a first image sequence and a collection time of each image frame, the first image sequence being collected by the terminal device in a first continuous time period before the current moment; and determine the relative motion speed and the relative motion direction according to the third positions and the collection times.

In some examples, the first determining module 620 is specifically configured to determine a fourth position when the target object enters the third photographing region according to the relative motion speed, the relative motion direction, the first position and the first distance; determine a second distance between the target object and the terminal device when the target object enters the third photographing region; and determine the focusing information according to the fourth position and the second distance.

In some examples, the first determining module 620 is further specifically configured to acquire a relative acceleration between the target object and the terminal device at the current moment; and correct the fourth position when the target object enters the third photographing region according to the relative acceleration.

In some examples, the first determining module 620 is further specifically configured to determine the second distance according to data obtained after the target object reflects light emitted from the terminal device.

In some examples, the photographing apparatus further includes a second determining module configured to determine a target moment when the target object enters the third photographing region according to the relative motion speed, the relative motion direction, the first position and the first distance.

In some examples, the focusing module 630 is further specifically configured to: adjust the corresponding focus of the second camera to be located on the target object at the target moment based on the focusing information.

In some examples, the photographing apparatus further includes: a third determining module configured to determine that the probability of the target object entering the third photographing region is greater than a threshold.

In some examples, the photographing apparatus further includes: a second acquiring module configured to acquire a second image sequence collected by the terminal device in a second continuous time period before the current moment and a collection time sequence corresponding to the second image sequence; a fourth determining module configured to determine a fifth position of the target object in each image frame in the second image sequence; a fifth determining module configured to determine a position sequence of the target object in the second continuous time period and a distance sequence between the target object and the third photographing region according to the fifth positions; a sixth determining module configured to determine a speed sequence and an acceleration sequence of the target object in the second continuous time period according to the position sequence and the collection time sequence; and a seventh determining module configured to determine a probability of the target object entering the third photographing region according to the speed sequence, the acceleration sequence, the position sequence and the distance sequence.

In some examples, the first acquiring module 610 is specifically configured to: perform instance segmentation on first photographing regions in two continuous image frames to acquire at least one object and a corresponding position in the first photographing region in each image frame; in response to monitoring movement of the terminal device, acquire a first displacement of the terminal device; determine a reference displacement corresponding to each object in the two continuous image frames according to the first displacement; determine a second displacement of each object in the two continuous image frames according to the at least one object included in the first photographing region in each image frame and the corresponding position; and in response to a mismatch between the second displacement corresponding to a first object in the at least one object and the corresponding reference displacement, determine the first object as the target object.

In some examples, the first acquiring module 610 is further specifically configured to: in response to monitoring that the terminal device does not move and the position of a second object in the at least one object changes in the two continuous image frames, determine the second object as the target object.

In some examples, the photographing apparatus further includes: a display module configured to display a view finding picture of the third photographing region in the image display interface of the terminal device.

For functions and specific implementation principles of the above modules in embodiments of the present disclosure, reference may be made to the above method embodiments, and details are not repeated herein.

In the photographing apparatus according to embodiments of the present disclosure, first, in the case where the target object is detected to be included in the first photographing region, the relative motion information between the target object and the terminal device is acquired, the photographing region corresponding to the first camera in the terminal device is the second photographing region, the photographing region corresponding to the second camera is the third photographing region, and the first photographing region is the region in the second photographing region other than the third photographing region; then, the focusing information when the target object enters the third photographing region is determined according to the relative motion information; and finally, in the case where the target object enters the third photographing region, focusing is performed on the target object based on the focusing information. Thus, after the target object appears in the first photographing region, the focusing information when the target object enters the third photographing region may be determined according to the relative motion information of the target object relative to the terminal device, such that accurate focusing can be performed on the target object when the target object enters the third photographing region, and then, the target object may be photographed clearly.

In order to realize the above embodiments, the present disclosure further provides an electronic device, including: a memory, a processor and a computer program stored on the memory and executable on the processor, and the processor executes the program to implement the photographing method according to the foregoing embodiments of the present disclosure.

In order to realize the above embodiments, the present disclosure further provides a computer-readable storage medium, which stores a computer program, and the computer program, when executed by a processor, implements the photographing method according to the foregoing embodiments of the present disclosure.

In order to realize the above embodiments, the present disclosure further provides a computer program product, which includes a computer program, and the computer program, when executed by a processor, implements the photographing method according to the foregoing embodiments of the present disclosure.

Figure 7:
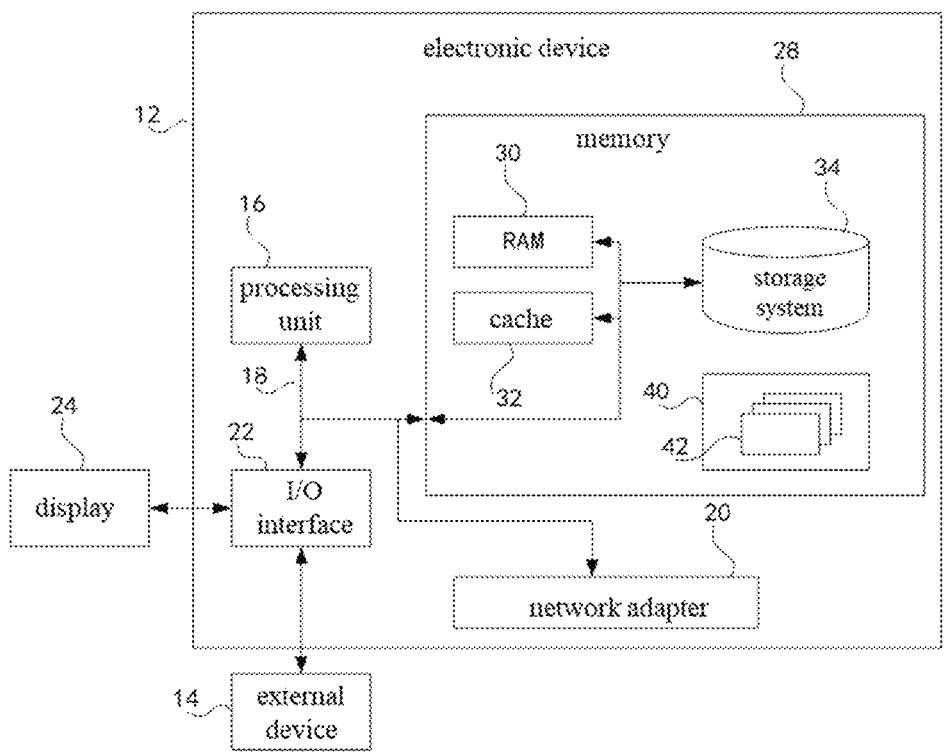
FIG. 7 shows a block diagram of an electronic device suitable for implementing embodiments of the present disclosure.

FIG. 7 shows a block diagram of an electronic device suitable for implementing embodiments of the present disclosure. The electronic device 12 illustrated in FIG. 7 is only an example and should not bring any limitation to the function and use range of embodiments of the present disclosure.

As illustrated in FIG. 7, the electronic device 12 is illustrated in the form of a general-purpose computing device. Components of the electronic device 12 may include, but are not limited to, one or more processors or processing units 16, a system memory 28, and a bus 18 which connects various system components (including the system memory 28 and the processing units 16).

The bus 18 represents one or more of several types of bus structures, including a memory bus or memory controller, a peripheral bus, an accelerated graphics port, a processor or a local bus using any of a variety of bus structures. By way of example, such architectures include, but are not limited to, an industry standard architecture (ISA) bus, a micro channel architecture (MAC) bus, an enhanced ISA bus, a video electronics standards association (VESA) local bus, and a peripheral component interconnection (PCI) bus.

The electronic device 12 typically includes a variety of computer system readable medium. Such medium may be any available medium which is accessible by the electronic device 12, and include both volatile and non-volatile medium, and removable and non-removable medium.

The memory 28 may include a computer system readable medium in the form of a volatile memory, such as a random access memory (RAM) 30 and/or a cache memory 32. The electronic device 12 may further include other removable/non-removable, volatile/non-volatile computer system storage medium. By way of example only, a storage system 34 may be provided for reading from and writing to a non-removable, non-volatile magnetic medium (not illustrated in FIG. 7 and typically called a "hard drive"). Although not illustrated in FIG. 7, a magnetic disk drive for reading from and writing to a removable, non-volatile magnetic disk (e.g., a "floppy disk"), and an optical disk drive for reading from or writing to a removable, non-volatile optical disk (such as a compact disc read only memory (CD-ROM), a digital video disc read only memory (DVD-ROM) or other optical medium) may be provided. In such instances, each drive may be connected with the bus 18 through one or more data medium interfaces. The memory 28 may include at least one program product having a set (e.g., at least one) of program modules which are configured to carry out the functions of embodiments of the present disclosure.

A program/utility 40 having a set (at least one) of program modules 42 may be stored in the memory 28 by way of example, and such program modules 42 include, but are not limited to, an operating system, one or more application programs, other program modules, and program data. Each of these examples or a certain combination thereof might include an implementation of a networking environment. The program modules 42 generally carry out the functions and/or methodologies described in embodiments of the present disclosure.

The electronic device 12 may also be communicated with one or more external devices 14 (such as a keyboard, a pointing device, a display 24, etc.); with one or more devices which enable a user to interact with the electronic device 12; and/or with any device (e.g., a network card, a modem, etc.) which enables the electronic device 12 to be communicated with one or more other computing devices. Such communication may occur via input/output (I/O) interfaces 22. In addition, the electronic device 12 may further be communicated with one or more networks (such as a local area network (LAN), a wide area network (WAN), and/or a public network (e.g., the Internet)) via a network adapter 20. As illustrated, the network adapter 20 is communicated with other modules of the electronic device 12 via the bus 18. It should be understood that although not illustrated in the drawings, other hardware and/or software modules may be used in conjunction with the electronic device 12, and include, but are not limited to: microcodes, device drives, redundant processing units, external disk drive arrays, RAID systems, tape drives, data backup storage systems, etc.

The processing unit 16 executes various function applications and data processing by running programs stored in the system memory 28, for example, implements the method according to the foregoing embodiments.

In the technical solution of the present disclosure, first, in the case where the target object is detected to be included in the first photographing region, the relative motion information between the target object and the terminal device is acquired, the photographing region corresponding to the first camera in the terminal device is the second photographing region, the photographing region corresponding to the second camera is the third photographing region, and the first photographing region is the region in the second photographing region other than the third photographing region; then, the focusing information when the target object enters the third photographing region is determined according to the relative motion information; and finally, in the case where the target object enters the third photographing region, focusing is performed on the target object based on the focusing information. Thus, after the target object appears in the first photographing region, the focusing information when the target object enters the third photographing region may be determined according to the relative motion information of the target object relative to the terminal device, such that accurate focusing can be performed on the target object when the target object enters the third photographing region, and then, the target object may be photographed clearly.

In the description of the present specification, reference throughout this specification to "an embodiment", "some embodiments", "example", "specific example" or "some examples" means that a particular feature, structure, material, or characteristic described in connection with the embodiment or example is included in at least one embodiment or example of the present disclosure. In the specification, the schematic expressions to the above-mentioned terms are not necessarily referring to the same embodiment or example. Furthermore, the described particular features, structures, materials, or characteristics may be combined in any suitable manner in one or more embodiments or examples. Furthermore, those skilled in the art may combine different embodiments or examples and features in different embodiments or examples described in the specification, without mutual contradictions.

In addition, the terms such as "first" and "second" are merely used for purposes of description and are not intended to indicate or imply relative importance or to imply the number of indicated technical features. Thus, the feature defined with "first" and "second" may include at least one of this feature explicitly or implicitly. In the description of the present disclosure, "a plurality of" means at least two, for example, two, three, or the like, unless specifically limited otherwise.

Any process or method described in the flow charts or other manners herein shall be understood as representing a code module, segment or portion including one or more executable instructions for implementing custom logic functions or process steps, and the scope of the preferred embodiments of the present disclosure may include other implementations. The functions may be executed not in the illustrated or discussed sequence, including in a substantially simultaneous order or an inverse order. It shall be understood by those skilled in the art.

The logic and/or steps described in the flow charts or in other manners, e.g., a sequential list of executable instructions for implementing logic functions, may be implemented in any computer-readable medium for usage of instruction execution systems, apparatuses or devices, such as computer-based systems, systems including processors, or other systems which can read instructions from an instruction execution system, apparatus or device and execute them, or in combination therewith to use. In the present application, "computer-readable medium" may be any apparatus that contains, stores, communicates, propagates or transmits programs for an instruction execution system, apparatus or device or in combination therewith for the usage. More particular examples of the computer-readable medium may include, but are not limited to, the following: an electrical connector (an electronic apparatus) having one or more connecting wires, a portable computer disk drive (a magnetic apparatus), a random access memory (RAM), a read-only memory (ROM), an erasable programmable read-only memory (EPROM or flash memory), a fiber optic apparatus, and a portable compact disc read-only memory (CDROM). In addition, the computer-readable medium may even be paper or another suitable medium on which the program can be printed. The program may be obtained in an electronic manner by optically scanning the paper or other medium and performing editing, interpreting or other processing if necessary, and stored in a computer memory.

It should be understood that each element described in the present disclosure may be implemented with hardware, software, firmware or a combination thereof. In the above implementation, a plurality of steps or methods may be implemented in software or firmware which is stored in the memory and executed by a suitable instruction execution system. For example, the hardware implementation is the same as that in another embodiment, which can be implemented with any one of the following technologies well-known in the art or a combination thereof: a discrete logic circuit having a logic gate circuit which implements a logic function for a data signal, a dedicated integrated circuit having a suitable combined logic gate circuit, a programmable gate array (PGA), a field programmable gate array (FPGA) and so on.

Those skilled in the art may understand that all or some steps for implementing the above embodiment methods may be completed by instructing relevant hardware through a program which may be stored in a computer-readable storage medium. When being executed, the program may include one of the steps or a combination of multiple steps of the method embodiment.

Furthermore, functional units in embodiments of the present disclosure may be integrated into one processing module, or each of the units may exist alone physically, or two or more units are integrated into one module. The above integrated module may be implemented in a hardware form or a software functional module form. When implemented in the software functional module form and sold or used as an independent product, the integrated module may be stored in a computer-readable storage medium.

The above-mentioned storage medium may be a read only memory, a magnetic disk, an optical disk, or the like. Although embodiments of the present disclosure have been illustrated and illustrated, it shall be understood that the above-mentioned embodiments are illustrative and not construed as limitations to the present disclosure. Various changes, modifications, alternatives and variants within the scope of the present disclosure may be made by those skilled in the art.

What is claimed is:

1. A photographing method, comprising:
   in response to detecting that a target object is included in a first photographing region, acquiring, by a terminal device, relative motion information between the target object and the terminal device, wherein a photographing region corresponding to a first camera in the terminal device is a second photographing region, a photographing region corresponding to a second camera in the terminal device is a third photographing region, and the first photographing region is a region in the second photographing region other than the third photographing region;
   according to the relative motion information, obtaining, by the terminal device, focusing information in response to determining that the target object enters the third photographing region; and
   performing, by the terminal device, focusing on the target object based on the focusing information,
   wherein before the step of according to the relative motion information, obtaining focusing information when in response to determining that the target object enters the third photographing region, the method further comprises:
   determining, by the terminal device, that a probability of the target object entering the third photographing region is greater than a threshold; and
   wherein before determining that the probability of the target object entering the third photographing region is greater than a threshold, the method further comprises:
   acquiring, by the terminal device, a second image sequence collected by the terminal device in a second continuous time period before the current moment and a collection time sequence corresponding to the second image sequence;
   determining, by the terminal device, a fifth position of the target object in each image frame in the second image sequence;
   determining, by the terminal device, a position sequence of the target object in the second continuous time period and a distance sequence between the target object and the third photographing region according to the fifth positions;
   determining, by the terminal device, a speed sequence and an acceleration sequence of the target object in the second continuous time period according to the position sequence and the collection time sequence; and
   determining, by the terminal device, a probability of the target object entering the third photographing region according to the speed sequence, the acceleration sequence, the position sequence and the distance sequence.

2. The method according to claim 1, wherein the relative motion information comprises relative position information between the target object and the terminal device, and acquiring relative motion information between the target object and a terminal device comprises:
   acquiring a current image frame;
   determining a first position of the target object in the current image frame and a second position of the third photographing region in the current image frame; and
   determining a first distance between the target object and the third photographing region according to the first position and the second position.

3. The method according to claim 2, wherein the relative motion information comprises a relative motion speed and a relative motion direction between the target object and the terminal device, and acquiring relative motion information between the target object and a terminal device further comprises:
   acquiring a third position of the target object in each image frame of a first image sequence and a collection time of each image frame, the first image sequence being collected by the terminal device in a first continuous time period before the current moment; and
   determining the relative motion speed and the relative motion direction according to the third positions and the collection times.

4. The method according to claim 3, wherein according to the relative motion information, obtaining focusing information in response to determining that the target object enters the third photographing region comprises:
   determining a fourth position in response to determining that the target object enters the third photographing region according to the relative motion speed, the relative motion direction, the first position and the first distance;
   determining a second distance between the target object and the terminal device in response to determining that the target object enters the third photographing region; and
   determining the focusing information according to the fourth position and the second distance.

5. The method according to claim 4, after determining a fourth position in response to determining that the target object enters the third photographing region according to the relative motion speed, the relative motion direction, the first position and the first distance, further comprising:

acquiring, by the terminal device, a relative acceleration between the target object and the terminal device at the current moment; and correcting, by the terminal device, the fourth position in response to determining that the target object enters the third photographing region according to the relative acceleration.

6. The method according to claim 4, wherein determining a second distance between the target object and the terminal device in response to determining that the target object enters the third photographing region comprises:

determining the second distance according to data obtained after the target object reflects light emitted from the terminal device.

7. The method according to claim 3, before performing focusing on the target object based on the focusing information, further comprising:

determining, by the terminal device, a target moment in response to determining that the target object enters the third photographing region according to the relative motion speed, the relative motion direction, the first position and the first distance.

8. The method according to claim 7, wherein performing focusing on the target object based on the focusing information comprises:

adjusting a corresponding focus of the second camera to be located on the target object at the target moment based on the focusing information.

9. The method according to claim 1, wherein detecting that a target object is included in a first photographing region, comprises:

performing instance segmentation on first photographing regions in two continuous image frames to acquire at least one object and a corresponding position in the first photographing region in each image frame;

in response to monitoring movement of the terminal device, acquiring a first displacement of the terminal device;

determining a reference displacement corresponding to each object in the two continuous image frames according to the first displacement;

determining a second displacement of each object in the two continuous image frames according to the at least one object comprised in the first photographing region in each image frame and the corresponding position; and in response to a mismatch between the second displacement corresponding to a first object in the at least one object and the corresponding reference displacement, determining the first object as the target object.

10. The method according to claim 9, after performing instance segmentation on first photographing regions in two continuous image frames to acquire at least one object and a corresponding position in the first photographing region in each image frame, further comprising:

in response to monitoring that the terminal device does not move and the position of a second object in the at least one object changes in the two continuous image frames, determining the second object as the target object.

11. The method according to claim 1, after performing focusing on the target object based on the focusing information, further comprising:

displaying, by the terminal device, a view finding picture of the third photographing region in an image display interface of the terminal device.

12. The method according to claim 1, wherein the method is applicable in one of following scenarios:

a scenario where the terminal device moves and the target object does not move;

a scenario where the terminal device does not move and the target object moves; or a scenario where the terminal device and the target object move at the same time.

13. An electronic device, comprising:

a memory;

a processor; and a computer program stored on the memory and executable by the processor, wherein the processor is configured to:

in response to detecting that a target object is included in a first photographing region, acquire relative motion information between the target object and the terminal device, wherein a photographing region corresponding to a first camera in the terminal device is a second photographing region, a photographing region corresponding to a second camera in the terminal device is a third photographing region, and the first photographing region is a region in the second photographing region other than the third photographing region;

according to the relative motion information, determine focusing information in response to determining that the target object enters the third photographing region; and perform focusing on the target object based on the focusing information in response to the target object entering the third photographing region, wherein the processor is further configured to:

determine that a probability of the target object entering the third photographing region is greater than a threshold; and wherein the processor is further configured to:

acquire a second image sequence collected by the terminal device in a second continuous time period before the current moment and a collection time sequence corresponding to the second image sequence;

determine a fifth position of the target object in each image frame in the second image sequence;

determine a position sequence of the target object in the second continuous time period and a distance sequence between the target object and the third photographing region according to the fifth positions;

determine a speed sequence and an acceleration sequence of the target object in the second continuous time period according to the position sequence and the collection time sequence; and determine a probability of the target object entering the third photographing region according to the speed sequence, the acceleration sequence, the position sequence and the distance sequence.

14. The electronic device according to claim 13, wherein the relative motion information comprises relative position information between the target object and the terminal device, and the processor is configured to:

acquire a current image frame;

determine a first position of the target object in the current image frame and a second position of the third photographing region in the current image frame; and determine a first distance between the target object and the third photographing region according to the first position and the second position.

15. The electronic device according to claim 14, wherein the relative motion information comprises a relative motion speed and a relative motion direction between the target object and the terminal device, and the processer is configured to:
  acquire a third position of the target object in each image frame of a first image sequence and a collection time of each image frame, the first image sequence being collected by the terminal device in a first continuous time period before the current moment; and
  determine the relative motion speed and the relative motion direction according to the third positions and the collection times.

16. The electronic device according to claim 15, wherein the processor is configured to:
  determine a fourth position in response to determining that the target object enters the third photographing region according to the relative motion speed, the relative motion direction, the first position and the first distance;
  determine a second distance between the target object and the terminal device in response to determining that the target object enters the third photographing region; and
  determine the focusing information according to the fourth position and the second distance.

17. The electronic device according to claim 16, wherein the processor is configured to:
  acquire a relative acceleration between the target object and the terminal device at the current moment; and
  correct the fourth position in response to determining that the target object enters the third photographing region according to the relative acceleration.

18. A non-transitory computer-readable storage medium having a computer program stored thereon, wherein the computer program is configured to cause a processor to implement acts comprising:
  in response to detecting that a target object is included in a first photographing region, acquiring relative motion information between the target object and the terminal device, wherein a photographing region corresponding to a first camera in the terminal device is a second photographing region, a photographing region corresponding to a second camera in the terminal device is a third photographing region, and the first photographing region is a region in the second photographing region other than the third photographing region;
  according to the relative motion information, obtaining focusing information in response to determining that the target object enters the third photographing region; and
  performing focusing on the target object based on the focusing information in response to the target object entering the third photographing region,
  wherein before the step of according to the relative motion information, obtaining focusing information when in response to determining that the target object enters the third photographing region, the acts further comprise:
  determining, by the terminal device, that a probability of the target object entering the third photographing region is greater than a threshold; and
  wherein before determining that the probability of the target object entering the third photographing region is greater than a threshold, the acts further comprise:
  acquiring, by the terminal device, a second image sequence collected by the terminal device in a second continuous time period before the current moment and a collection time sequence corresponding to the second image sequence;
  determining, by the terminal device, a fifth position of the target object in each image frame in the second image sequence;
  determining, by the terminal device, a position sequence of the target object in the second continuous time period and a distance sequence between the target object and the third photographing region according to the fifth positions;
  determining, by the terminal device, a speed sequence and an acceleration sequence of the target object in the second continuous time period according to the position sequence and the collection time sequence; and
  determining, by the terminal device, a probability of the target object entering the third photographing region according to the speed sequence, the acceleration sequence, the position sequence and the distance sequence.

* * * * *